INVENTORS
ALEXANDER V. HOSE
NORMAN F. PRESCOTT

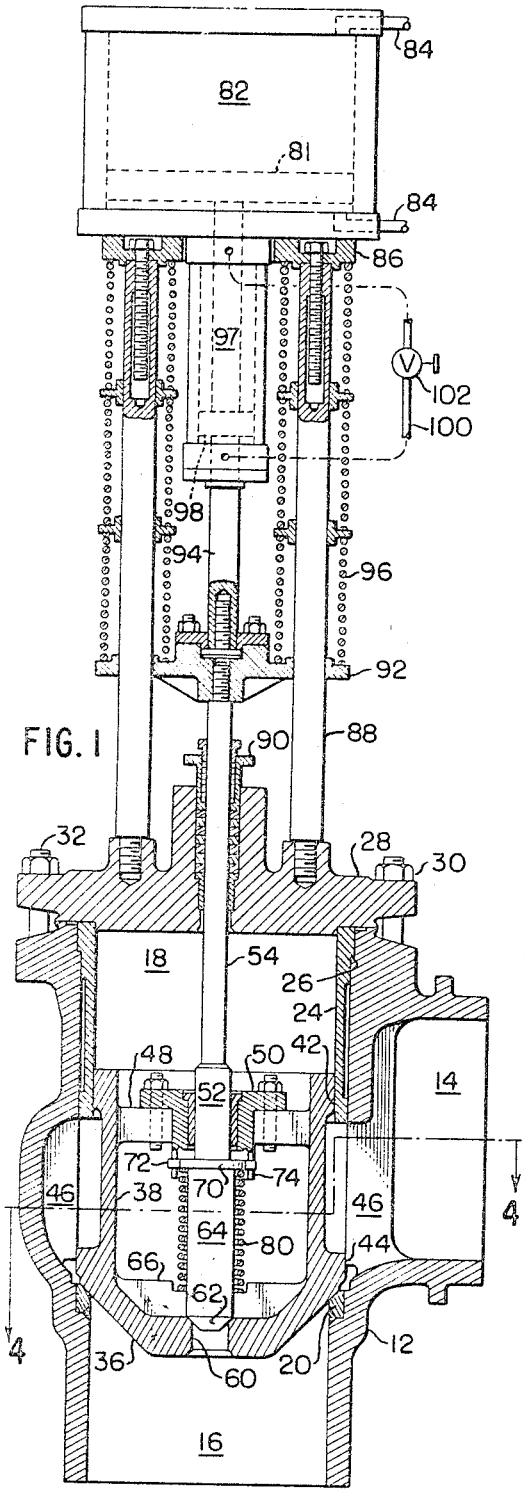

ATTORNEYS

United States Patent Office 3,428,090
Patented Feb. 18, 1969

3,428,090
SHUT-OFF VALVE
Alexander V. Hose, Marblehead, and Norman F. Prescott, Wenham, Mass., assignors to Atwood & Morrill Co., Salem, Mass., a corporation of Massachusetts
Filed June 7, 1966, Ser. No. 555,742
U.S. Cl. 137—630.14                5 Claims
Int. Cl. F16k 31/363, 31/383

The present invention relates to valves, and more particularly to shut-off or isolation valves of large capacity that are required to operate under high fluid pressures.

In the case of disc or poppet type valves of large passage area, the force required to open the valve against high pressures, of the order of 1,000 lbs. per sq. in., may be in the hundreds of thousands of pounds, i.e., approximately 450,000 lbs. for a 24 inch valve. Actuating mechanisms of such capacity must necessarily be extremely powerful and massive.

To minimize the force required to open large-capacity valves against high fluid pressures, various means have been employed to reduce the pressure differential across the valve. One approach is to employ a balanced type of valve, so that the pressure differential tending to hold the valve closed is only a fraction of the total pressure head. However, such a valve lacks the advantage of utilizing the full head of pressure to maintain the valve tightly closed and may require positive mechanical closing means to secure the piston in closed position, if the valve is designed to be very nearly balanced so as to reduce substantially the force required to open the valve.

Another approach has been to provide a two-stage opening, in which a pilot valve of relatively small area is arranged to be opened in advance of the main valve, in order to initiate a partial flow and thereby decrease the pressure drop across the valve. However, such piloted-type valves, if of large size, generally still require relatively massive and powerful actuating mechanisms to provide sufficient force to open the main valve, even under the reduced head afforded by the opening of the pilot valve.

While attempts have heretofore been made to combine the features of pressure-balancing and the use of a pilot valve, these generally have not resulted in successful valves, in part because of the difficulties in providing proper control and correlation of the operation of the moving parts during the opening and closing sequences.

It is therefore an object of the present invention to provide an improved high pressure, large-capacity valve which may be opened with relatively moderate force, yet makes use of the full fluid pressure head on the upstream side of the valve when the valve is in closed position.

A feature of the invention involves the utilization, in combination, of a pilot valve in conjunction with a main valve that is subjected to the full head of pressure when both the main valve and the pilot valve are closed, but which automatically changes to a substantially pressure-balanced condition upon the opening of the pilot valve.

A further feature of the invention involves a novel and effective interconnection between the valve actuating stem and the movable valve element so that the opening and closing movements of the valve may be carried out smoothly and with complete stability over the full range of opening and closing movement by simple axial motion of the stem.

In the drawings illustrating the invention,

FIG. 1 is a view in side elevation, partly in section, showing a valve with actuating mechanism mounted thereon, the valve being of the type in which the outlet passage is at a right angle to the inlet passage, the valve being shown in closed position.

FIG. 2 is a view in sectional elevation with the actuating mechanism omitted, showing the valve at the stage of opening when the pilot valve is fully open but the main valve is still seated.

FIG. 3 is a view showing the valve in fully open position.

Figure 4:
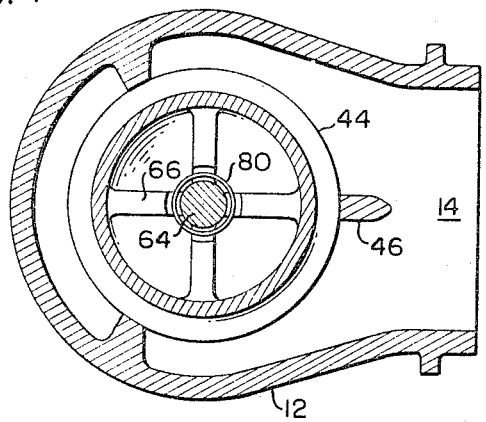
FIG. 4 is a sectional view taken on the line 4—4 of FIG. 1.

In the embodiment of the invention illustrated in FIGS. 1–4, the valve body indicated generally at 12 is provided with inlet passage 14 and outlet passage 16 disposed in mutually perpendicular relation. The valve body has, in general, a T-shaped configuration by reason of a cylindrical chamber 18 which is coaxial with and upstream from the circular valve seat 20 at the upstream end of outlet passage 16. The chamber 18 is defined by a sleeve 24, the upper end of which is provided with a shoulder 26 which seats within a shouldered recess in the valve body to cause the sleeve to be firmly secured in the body when the cover plate 28 is clamped in place by nuts 30 on studs 32.

The opening and closing of the valve is effected by a movable piston having a head 36 and a skirt 38. The piston head is preferably in the form of a truncated cone, the outer margin of which is adapted to engage the conical surface of the seat ring 20 when the piston is in closed position.

The skirt portion of the piston is formed adjacent the open end with a land region 42 having an outside diameter to provide a sliding fit within the sleeve 24, thereby enabling the piston to be retracted into the chamber when the valve is open. The head portion of the piston, outwardly and rearwardly of the seating region, is likewise provided with a land region 44, preferably of somewhat greater diameter than that of land 42. This land region 44 adjacent the head is arranged for sliding engagement with guide webs 46 to provide positive and accurate guiding of the head end of the piston over the range of movement of the piston. As best shown in FIG. 4, the guide webs 46, which may be integrally formed with the valve body, are equally spaced around the piston, with a single, relatively thin web in the center of the inlet passage. Intermediate the two lands regions 42 and 44, the piston skirt is of reduced outer diameter to provide appreciable clearance between the skirt and the sleeve 24. It will be noted, further, that the diameter of land region 44 at the head is greater than that of the land 42 adjacent the open end of the piston by an amount which makes the guide surfaces of the webs 46 substantially coextensive with the bore in valve body 12 within which the sleeve 24 is received.

The piston skirt, adjacent the open end, is provided with integral, inwardly extending lugs 48 to which is secured a flanged member 50 bushed to make sliding engagement with portion 52 of the valve stem 54 by which the piston is operated from outside the body by mechanism hereinafter described.

The piston head 36, in the central region, is provided with a passage 60 preferably having beveled or chamfered ends. The inner bevel provides a valve seat to receive the beveled surface 62 of the end portion 64 of the valve stem. Integral webs 66 within the head provide centering support for the end 64 of the stem during its motion toward and away from the seat.

The valve stem is provided at the upper end of enlarged section 64 with a collar 70 firmly secured thereto. The length of the end section 64 of the stem is such that the collar 70 is spaced from the underside of flanged member 50 when the lower end of the stem is seated against the head to close the pilot passage 60. The collar is formed with extension 72 which are guided within slots in a skirt 74 projecting downwardly from the flanged member 50 to prevent rotation or "windmilling" of the piston on the stem.

To provide a positive bias or force in a direction to hold the main valve piston firmly closed while the stem is being retracted to open the pilot passage, a relatively powerful compression spring 80 is positioned between the underside of collar 70 and the inside of the piston head. By way of example, in a typical valve of approximately 24″ diameter, the spring preferably will exert a force in excess of 2,000 lbs. between the valve stem and the piston in a direction tending to move the piston away from the end of the stem. To avoid flow interference between the retracted end 62 of the stem and the pilot passage 60 when the pilot valve is opened, the lower end of the spring preferably is seated on the slightly recessed top surfaces of the webs 66.

Before describing the operation of the valve in its opening and closing sequences, the stem actuating mechanism shown in FIG. 1 will be described. It will be understood that this mechanism is not to be considered as limiting the invention, but represents a particular embodiment of actuating mechanism having the desirable feature of automatically closing the valve in the event of power or control failure. The actuator is of the pneumatic type, having a piston 81 within cylinder 82 to which air or other gas under pressure from a source, not shown, may be admitted to one side of the piston or the other, and exhausted from the discharge side, via conduit 84. The cylinder 82 is mounted on a plate 86 which is secured by relatively long bolts to the upper ends of struts 88, the lower ends of which are threaded into the cover 28 on the valve body. The valve stem 54 passes through stuffing box 90 and is secured in a spring saddle plate 92 to which the output member 94 from actuating cylinder 82 is connected. Multiple sets of compression springs 96 extend between the flange 86 and the spring saddle plate 92 to drive the valve stem downwardly and close the valve, should any failure occur in the actuating system or its controller. The springs must be strong enough so that after the main valve has closed, spring 80 will be overpowered and the stem 64 moved downwardly within the piston to close the pilot valve within the piston head.

In conjunction with the operation of the valve by the actuating mechanism just described or by other types of fluid-powered means, it is desirable to provide positive and precise control of the rate of opening and particularly the closing movement of the valve. To provide such control, a dashpot mechanism is employed comprising hydraulic cylinder 97 having a piston 98. The cylinder 97 is secured to the underside of plate 86 with the output member 94 from piston 81 passing through the cylinder 97 with piston 98 secured to the member 94. The chambers above and below the piston 98 are filled with hydraulic fluid, while conduits 100 provide flow communication from one chamber to the other under the control of a valve 102 having a needle valve or other precise flow control means adjustable by a fine-pitch screw or micrometer adjustment. By varying the setting of the flow control means 102, the operation of the valve, and particularly the closing movement thereof, may be caused to take place slowly and smoothly over a period ranging from a few seconds to twenty seconds or more, to meet system requirements for gradual flow shut-off.

The operation of the valve will now be described, commencing with the valve in closed position as shown in FIG. 1. In this view, both the main valve and the pilot valve are closed, as the result of a downward thrust on the stem sufficient to overcome the upward force of compression spring 80 against collar 70 as already pointed out. Under these conditions, the full head of fluid pressure on the upstream side of the valve is being exerted on the piston over an effective area represented by the diameter of the valve seat 20. The reason for this is that the sliding fit between the upper land 42 on the piston skirt and the sleeve 24 permits leakage of fluid into the chamber 18 and into the piston. Thus the pressure in chamber 18 and against the inside of the head becomes substantially that at the valve inlet 14. As a result, if the valve is of large diameter and the fluid pressure of the order of 1,000 lbs. p.s.i. or more, it is held closed by a force substantially greater than would be feasibly developed by conventional actuating mechanisms.

When the valve is to be opened, the first step is the preliminary withdrawal of the stem to the position shown in FIG. 2. This has the effect of opening the pilot passage to allow the escape of the fluid under pressure within the piston and from the chamber 18 above the piston. As the effective area of the stem at the pilot passage seat is relatively small as compared to the total valve area, the stem is readily withdrawn to open the pilot passage, with the stem motion proceeding gradually and precisely under the control of the actuator and dashpot. It will be noted that the effect of the compression spring during the opening of the pilot valve is to provide a powerful bias or force in a direction to insure that the main valve is maintained in tight sealing engagement with its seat.

Once the stem has lifted to relieve the full head of pressure above the piston and in chamber 18, an automatic conversion takes place from an unbalanced pressure condition to a substantially balanced type of valve. Such change-over occurs because the flow leakage from the inlet passage 14 into the chamber 18 is substantially less than the flow permitted by the open pilot passage 60. That is, the leakage path between land 42 at the top of the piston skirt and the adjacent wall of the sleeve 24 provides substantially less effective area than the area of the passage 60. As a result, the closing force of the upstream pressure on the piston is now opposed by a force in the opposite direction that is substantially represented by the upstream pressure exerted over an area corresponding to the diameter of the piston within the sleeve, i.e., of land 42. As this diameter is slightly less than the effective diameter of the contact zone between piston and seat ring 20 on the outlet side of the piston, there remains a net force on the piston in closing direction as a result of the upstream fluid pressure, aided at this stage by the substantial force provided by spring 80.

In FIG. 2, the parts are shown with the main valve still seated and the pilot passage fully open, with the collar 70 close to or barely touching the underside of flange member 50. With further upward lifting movement of stem 54, the positive engagement of the collar with member 50 serves to lift the main valve from its seat, thereby allowing the main flow of fluid from inlet to outlet to commence. Before the piston has lifted, the force of compression spring 80 has been effective to hold the piston tightly seated. Now that the piston has been drawn away from its seat, the spring serves to position the piston firmly on the stem with the collar seated against the member 50 to prevent axial shifting. During the retracting of the piston to the fully open position represented by FIG. 3, the piston is accurately guided by the webs 46 as well as by the engagement of land 42 with the sleeve 24, while the extensions 72 on collar 70 prevent any rotation of the piston relative to the stem.

The reverse sequence takes place during the closing operation. During the lowering of the piston, the spring 80 maintains the piston on the stem in a position to keep the pilot valve open, with the result that the initial seating of the piston occurs under approximately balanced pressure conditions. Thereafter the valve stem is moved downwardly by its actuating mechanism against the force of compression spring 80 to maintain the piston firmly seated while the pilot passage 60 is being closed, after which the full head of pressure builds up on the upstream side of the piston. During the closing sequence, the hydraulic dashpot 97, with its piston directly mounted on the actuator rod 94, provides positive control of the rate of closing due to the flow of hydraulic fluid from the underside of piston 98 past the precisely adjustable control valve 102 into the top chamber of the dashpot cylinder 96.

Figure 5:
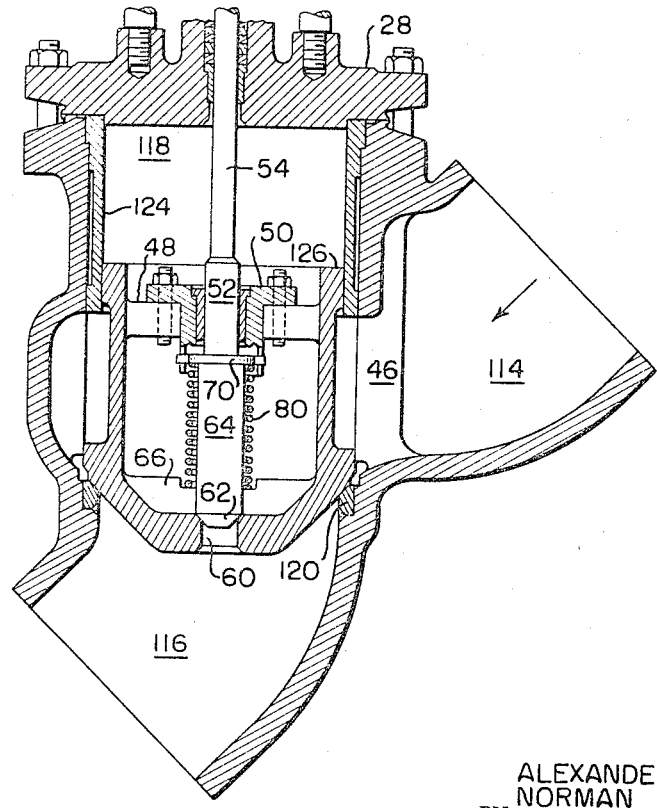
FIG. 5 is a sectional view of an alternate form of valve showing the invention embodied in a construction in which the outlet and inlet passages are in aligned relation, for installation in a straight run of piping.

While the invention has been described as embodied in a valve having a right angle configuration of inlet and outlet flow passages, the same general construction and principle of operation may be provided in a valve that can be used in a straight run of piping. FIG. 5 shows such an embodiment. The inlet and outlet passages 114 and 116 are aligned, with the seat ring 120 disposed in a plane tilted at approximately 45° to the flow axis of inlet and outlet. The chamber 118, having a sleeve or liner 124 within which piston 126 slides, is coaxial with the seat ring and is therefore oblique to the inlet and outlet axes. Otherwise there are no significant differences over the embodiment illustrated in FIGS. 1–4.

It will be understood that valves constructed and operating in accordance with the invention may have different angular relationships of inlet and outlet than those herein illustrated and described, and that other types of actuating mechanisms may be employed to suit particular requirements or to utilize available energy sources. It will be further understood that modifications in the construction and configuration of the valve parts are possible within the scope of the invention as set forth in the appended claims.

What we claim as our invention is:

1. A valve comprising a valve body having inlet and outlet passages and a circular valve seat intermediate said passages, a cylindrical chamber in the valve body coaxial with and spaced from the valve seat on the upstream side thereof, a valve piston having head and skirt portions, the skirt portion being slideably disposed within said chamber, the head portion of the piston having a seating surface which engages the circular seat in the valve body when the piston is in closed position, the head portion of the piston having a pilot passage therethrough and a valve seat at the inner end of the pilot passage, actuating means for the piston comprising a stem to which the piston is connected for limited relative sliding movement, said stem extending through the valve body to the exterior thereof, means outwardly of the body for reciprocating the stem within the body in non-rotating relation thereto, the skirt portion of the piston having a central support portion through which the stem passes in sliding relation, a pilot valve at the end of the stem within the piston in rigid non-rotating relation to said stem, said pilot valve engaging the pilot valve seat to close the pilot passage when the stem is displaced to the limit of its movement relative to the piston in the direction of the piston head, a collar rigidly connected to the stem between the head of the piston and the support within the piston skirt, a compression spring intermediate the collar on the stem and the head end of the piston urging the piston along the stem in a direction toward the valve seat in the body, and guide means within the head portion of the piston spaced around the pilot valve seat therein, said means being slideably engaged by the valve stem adjacent its pilot valve portion.

2. A valve according to claim 1, having sliding connections between the collar on the stem and the support within the piston skirt through which the stem passes in sliding relation for preventing relative rotation between the piston and the stem.

3. A valve according to claim 1, wherein the piston has a first land at the skirt end in sliding contact with the wall of the cylindrical chamber in the valve body, a second land adjacent the head of the piston outwardly of the seat-engaging portion of said head, and spaced guide means within the flow passage in the valve body outwardly of the valve seat for the piston, with which the second land of the piston makes sliding contact during opening and closing of the valve to provide guiding support for the head end of the piston.

4. A valve according to claim 1 wherein the head of the piston has spaced ribs projecting inwardly therefrom, the ends of the ribs making sliding contact with the stem close to its pilot valve portion to provide guiding contact between stem and piston head during movement of the pilot valve relative to the pilot valve seat.

5. A valve according to claim 4 wherein the compression spring is seated on said ribs.

References Cited
UNITED STATES PATENTS

| 931,228 | 8/1909 | Schutte | 251—29 |
| 1,198,120 | 9/1916 | Gill | 251—38 |
| 1,729,458 | 9/1929 | Schwendner | 251—28 X |
| 1,804,060 | 5/1931 | Morrill | 251—28 X |
| 991,230 | 5/1911 | Noyes | 251—38 |

ARNOLD ROSENTHAL, *Primary Examiner.*

U.S. Cl. X.R.

251—47